United States Patent [19]

Call

[11] Patent Number: 5,023,929

[45] Date of Patent: Jun. 11, 1991

[54] AUDIO FREQUENCY BASED MARKET SURVEY METHOD

[75] Inventor: James Call, Larchmont, N.Y.

[73] Assignee: NPD Research, Inc., Port Washington, N.Y.

[21] Appl. No.: 245,739

[22] Filed: Sep. 15, 1988

[51] Int. Cl.[5] ........................ H04B 17/00; H04N 7/10

[52] U.S. Cl. ........................................... 455/2; 358/84

[58] Field of Search ........................ 455/2; 358/84, 86; 364/900; 379/92; 381/58; 369/7

[56] References Cited

U.S. PATENT DOCUMENTS

| | | | |
|---|---|---|---|
| 4,230,990 | 10/1980 | Lert, Jr. et al. | 455/2 |
| 4,546,382 | 10/1985 | McKenna et al. | 455/2 |
| 4,603,232 | 7/1986 | Kurland et al. | 379/92 |
| 4,618,995 | 10/1986 | Kemp | 455/2 |
| 4,695,879 | 9/1987 | Weinblatt | 455/2 |

FOREIGN PATENT DOCUMENTS

| | | | |
|---|---|---|---|
| 2555383 | 5/1985 | France | 455/2 |

*Primary Examiner*—Reinhard J. Eisenzopf
*Assistant Examiner*—Lisa Charouel
*Attorney, Agent, or Firm*—Bryan, Cave, McPheeters & McRoberts

[57] ABSTRACT

A method for obtaining audience preference market survey data, such as a radio and/or television listening audience survey and/or supplemental data, such as bar coded data (156), from a plurality of diverse locations for accumulative processing by a remote data processor, involves recording (22, 30, 40, 42, 44, 56, 54, 52) a plurality of audio signals (46, 48, 50) at each of the diverse locations which corresponds to the ambient radio and/or television audio sound at predetermined synchronized discrete sampling times (42, 60, 64, 66, 62) or windows which are synchronized to a master recording (110) of the programs being surveyed. The sampling windows are of short duration with respect to the measurement interval. The master recording (110) audio signals frequency intervals are matched against the frequency of the diverse location audio samples to provide an indication of audience preference and tested for a correct match in a configurable filter array (120, 122, 124). Respondents at the diverse locations may be provided with portable tape recorders (30) which are automatically activated at synchronized clock times to obtain the audio samples. Bar code scanning information (150, 24) may also be provided in the form of audio signals by using the scanning signal (152) to drive a voltage controlled audio oscillator (160).

46 Claims, 16 Drawing Sheets

AUDIO FREQUENCY BASED MARKET SURVEY METHOD

CROSS REFERENCE TO RELATED APPLICATIONS

This application is related to my comtemporaneously filed, commonly owned, copending U.S. patent application entitled "Audio Frequency Based Data Capture Tablet", the contents of which is specifically incorporated by reference herein its entirety.

TECHNICAL FIELD

The present invention relates to a system and method for obtaining a measurement of audience response to radio or TV programming as well additional market survey information of audience preferences employing the storage and transmission of audio information for remote processing and computer analysis.

BACKGROUND OF THE ART

Systems for use in field data collection, at diverse locations, to determine radio/TV audience listing behavior, or other audience preferences such as survey/questionnaire responses, the movement or status of bar-coded items in production, purchase, or other market transactions, or to convert manually completed questionnaires to computer-readable form are well known in the art, such as disclosed in U.S. Pat. Nos. 4,355,372 and 4,603,232, by way of example. For example, prior art attempts at monitoring audience response to radio or television programming have included continuous live monitoring of broadcasts looking for real time matches on the fly of data, such as disclosed in U.S. Pat. No. 2,630,366, and the digitized storage of selected program segments for subsequent audio match, such as disclosed in U.S. Pat. Nos. 4,499,601, 4,450,531, and 4,511,917. In addition prior art electronic polling or audience survey systems are well known in the art, such as disclosed in U.S. Pat. Nos. 3,725,603; 3,587,070; 4,566,030; 4,377,870; 4,216,497; and 4,290,141; and British Patent No. 1,536,414. However, none of these prior art systems discloses a system or method for discrete synchronized sample monitoring and storage of ambient sounds at a plurality of diverse locations which are analyzed against a remote synchronized master recording and used to provide an audience survey, nor does such prior art disclose a system in which audio information corresponding to bar code data may also be stored at the diverse locations, such as UPC type data by way of example, for providing supplemental market survey data of other audience preferences to the central location.

In most prior art cases known to applicants, each specific data collection need has resulted in specialized hardware and systems. For example, patterns of responses have been manually entered on survey response paper questionnaires by blackening pre designated response areas, depending on the desired answer to a survey question. These paper forms are then "read" by specialized optical mark reading equipment (OMR) in which an array of photo cells detect, in a binary fashion, the presence or absence of response marks. The binary pattern output is then processed by a digital computer. The optical mark reading equipment is specialized to such a degree that while it capably reads such marks, it is practically useless, for example, for reading bar codes. Similarly, existing equipment for reading bar codes is generally not practical for reading optical mark sheets. Nevertheless, it usually is desirable to collect multiple types of information, for example in market research, in a single setting. This is because the variety of types of information, (bar code, alpha-numeric, verbal responses, images, etc.) are generally fundamentally related. In market research, for example a purchase transaction (characterized by numbers for quantity and outlet) is related to the product (characterized by a bar code) and a perceived need or product opinion (as revealed by answers to survey questions) and is influenced by advertising (as heard in an audio/visual format over radio or TV). The market research industry, as well as numerous other industries including manufacturing and distribution, have a great need for single source data, but the unified collection of such data, using system described in the prior art, is not economically feasible due to the specialization, diversity and incompatability of the data collection systems involved. The recombining and correlating of such diversely gathered data, for subsequent analysis is time consuming and error prone, and when it can be done at all, results, ultimately, in a social cost through higher consumer prices or less efficient market decisions. The specialization of data collection, recording and transmission approaches is the result of incompatible data formats and transmission protocols that have become ingrained.

The specialization noted above has perhaps been best typified in bar-code reading systems. Miniaturization of microcomputers and solid state memories has resulted in powerful hand-held microcomputerized bar-code readers and data collection instruments which decode the bar-code immediately upon scanning, verify it by means of the normally included check digit, and store the resulting numeric data in a solid state memory in traditional binary codes. In applications where relatively few such hand-held computers are needed, for example in inventory control, they have been reasonably practical and cost-effective. However, they are still complex and relatively expensive, even with existing large scale integrated circuits.

Moreover, these systems generally translate the digitally stored data into special tones for telephone transmission. Then, at the receiving end, the tones must be reconverted back to a digital format. This process of "modulation" and "demodulation" requires complex and expensive hardware, termed "modems", to carry out the transmission process.

Thus, the prior art systems known to applicant have not proven to be both efficient and cost effective. These disadvantages of the prior art are overcome by the present invention.

DISCLOSURE OF THE INVENTION

A method for obtaining audience preference market survey data, such as a radio and/or television listening audience survey, and/or supplemental market survey data, such as bar coded data or other market survey information, from a plurality of diverse locations for accumulative processing of this collected data by a remote data processor, involves recording a plurality of audio signals at each of the diverse locations which correspond to predetermined market survey data categories, such as generating an audio signal from bar code scanning of UPC type data, and/or to ambient sounds, such as radio and/or television audio at the diverse locations for providing an audio snapshot of radio and- /or television audience viewing at the diverse location. The recorded audio signals are then provided to the remote data processor such as by a wired or wireless link, such as a telephone and/or radio type link, where the audio signals are analyzed and accumulatively processed to provide a market survey report. With respect to obtaining such listening audience survey, the presently preferred method further comprises providing a master audio signal recording at the central location of ambient sounds corresponding to the audio outputs of a predetermined plurality of different radio and/or television channels for which the listening audience is to be surveyed, with this master recording being synchronizeded to the diverse location audio signal recordings so that the ambient sounds recorded by the master recording are at substantially the same regular discrete predetermined sampling intervals as at the diverse locations for providing a substantially like plurality of spaced apart sampling windows over the predetermined measurement interval. These sampling windows are preferably of short duration with respect to the predetermined measurement interval, with the master sampling windows preferably being slightly larger than the recorded diverse location sampling windows. In order to analyze and process the recorded audio signals from the diverse locations and match them against the master recording audio signals, the discrete frequency content of the master audio recording sample, such as obtained by performing a Fast Fourier Transform (FFT) on the recorded master audio signal samples, are matched against the frequency content of the diverse location audio samples from the recorded sample audio sound windows to look for matches which, when confirmed, provide an indication of listening audience preference for the resultant audience survey report. Preferably, the audio samples are obtained at the diverse locations by providing respondents with portable tape recorders which are individually worn or carried and are automatically activated at discrete predetermined clock intervals to automatically record the ambient sound during the designated sampling window. With respect to bar code scanned data, an audio oscillator may be employed in conjunction with the bar code scan to convert the scan into audio signals which are reconverted back into digital data by the remote data processor. Other devices for converting market survey data into audio signals may be employed in the present method, with the remote data processor then reconverting this data into data usable by it to provide the accumulated market survey report.

BEST MODE FOR CARRYING OUT THE INVENTION

Figure 1:
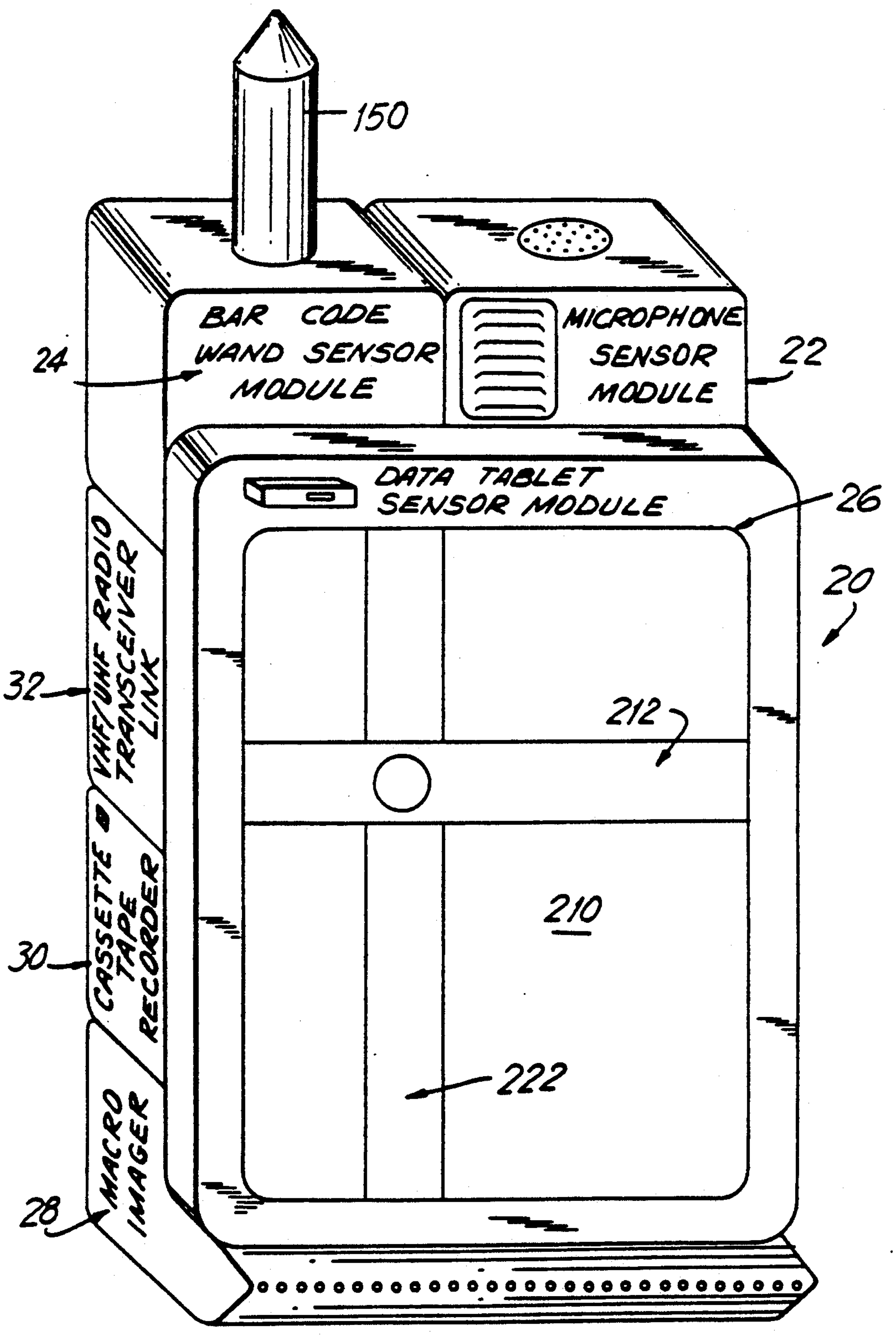
FIG. 1 is a diagrammatic illustration of an audio information input and recording device usable with the presently preferred method of the present invention.
Figure 2:
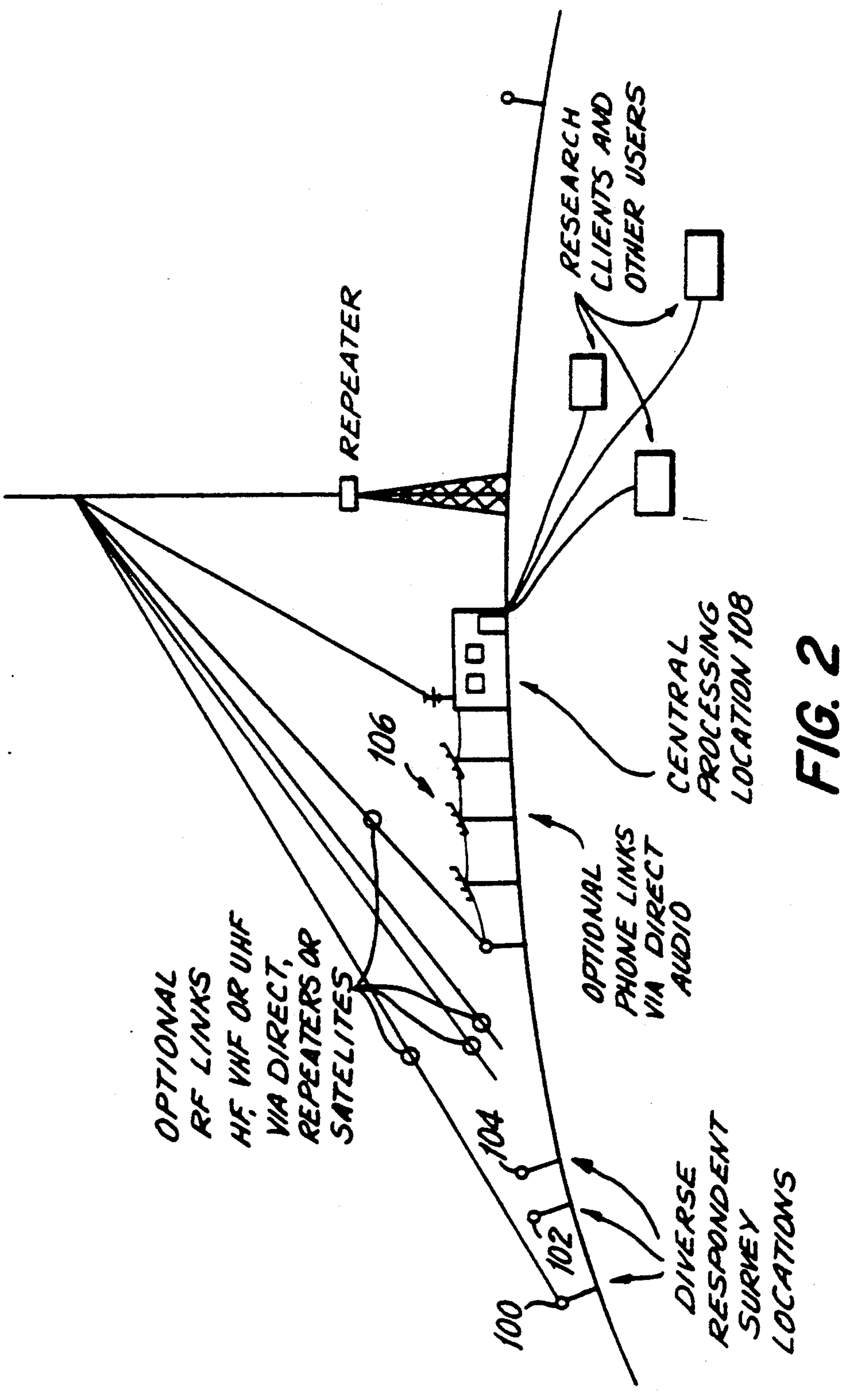
FIG. 2 is a diagrammatic illustration of a market survey data transmission system usable with the presently preferred method of the present invention.

Referring now to the drawings in detail, and initially to FIG. 1, a data acquisition device, generally referred to by the reference numeral 20, is shown. The data acquisition device 20 is capable of use in practicing the presently preferred method of the present invention, and preferably includes a plurality of data acquisition modules 22, 24, 26, 28, each capable of storing the acquired data as an audio signal onto conventional storage media such as, for example, magnetic tape, or magnetic or laser disks. Preferably, there are four such sensor modules, 22, 24, 26, 28 shown, and a conventional audio recorder 30 and an associated conventional transmission and control subsystem 32, such as a conventional VHF/UHF radio transceiver link or telephone transmission link. As will be explained in greater detail with reference to FIG. 2, the present invention allows for an essentially immediate reporting of audience measurement and/or other market data to a central location through the use of audio information corresponding thereto.

Figure 3:
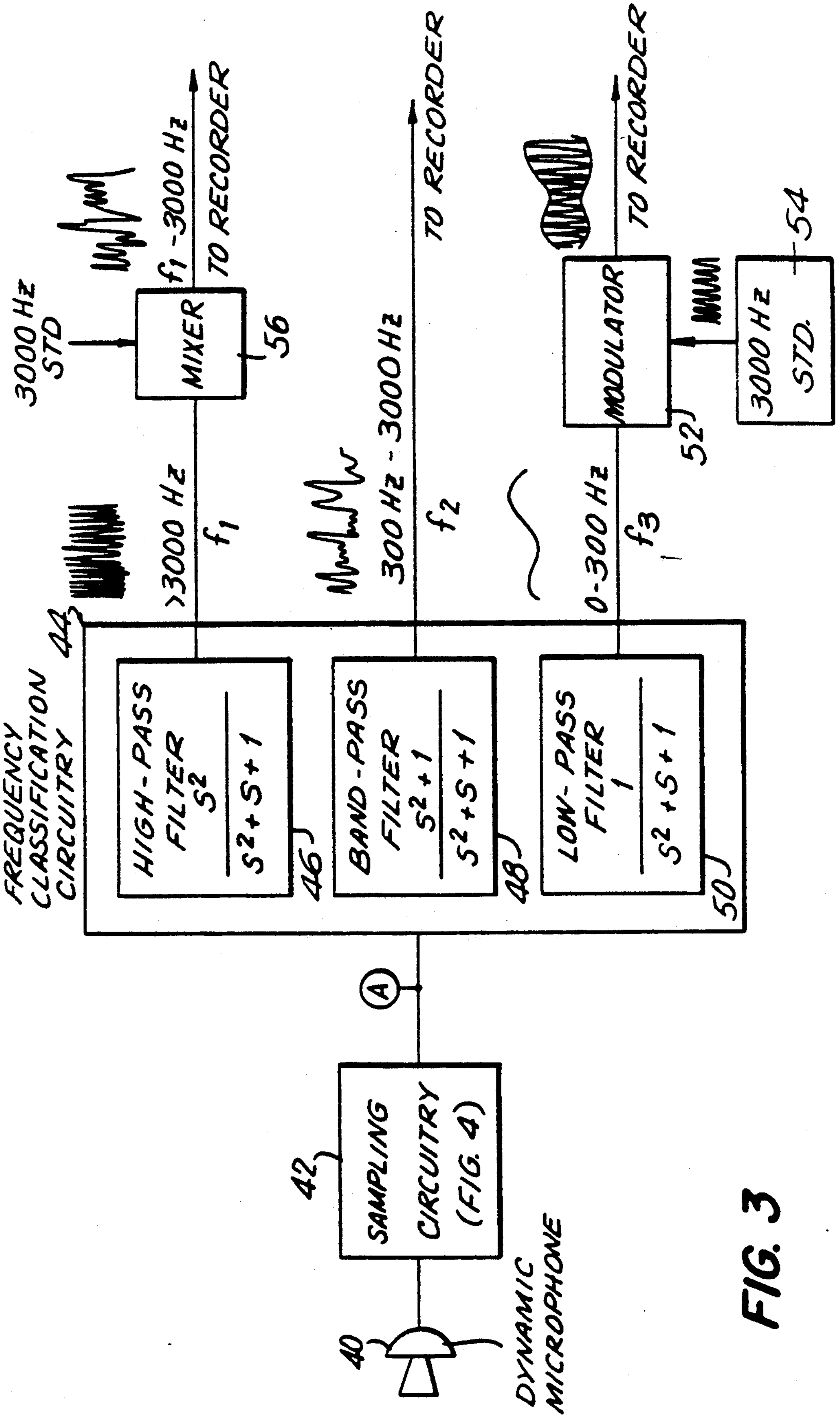
FIG. 3 is a block diagram, partially diagrammatic, of a microphone sensor module portion of the device of FIG. 1.

The microphone sensor module 22 preferably employs an audio microphone and associated conventional signal conditioning, filtering and sampling circuitry so as to preferably permit the recording of sounds with frequencies above and below the range of 300 Hz to 3,000 Hz. This range is the range that is normally transmittable over conventional telephones and FM radio communication links. Preferably, in order to store and transmit such "out-of-band" signals, a pre-filter classifies the microphone-sensed signal as under 300 Hz; from 300 Hz to 3,000 Hz, or; above 3,000 Hz. A block diagram of a typical microphone sensor 22 is shown in FIG. 3. As shown and preferred in FIG. 3, the sensor 22 comprises a conventional dynamic microphone 40, sampling circuitry 42 shown in greater detail in FIG. 4, and frequency classification circuitry 44 which preferably consists of a conventional high pass filter 46 for passing signals above 3,000 Hz, a conventional mid range band pass filter 48 for passing signals in the range of 300 Hz to 3,000 Hz, and a conventional low pass filter 50 for passing signals less than 300 Hz. Signals less than 300 Hz output through filter 50 are recorded by preferably using them to modulate a 3,000 Hz tone via conventional modulator 52 and tone generator 54. Signals in the "normal" range of 300 to 3,000 Hz output from filter 48 are preferably recorded and processed without conditioning, other than for amplitude. Finally, signals greater than 3,000 Hz, which are output from filter 46, are preferably mixed with a conventionally provided 3,000 Hz signal through heterodyning, via conventional mixer 56, in order to produce a sum and difference frequency, the difference frequency preferably being recorded as the signal of interest. This approach is preferably used once for signals up to 6,000 Hz, which would provide a 3,000 Hz "beat note", but may, if desired, be cascaded in each succeeding 3,000 Hz band up to the upper limit of commercially interesting frequencies.

Figure 4:
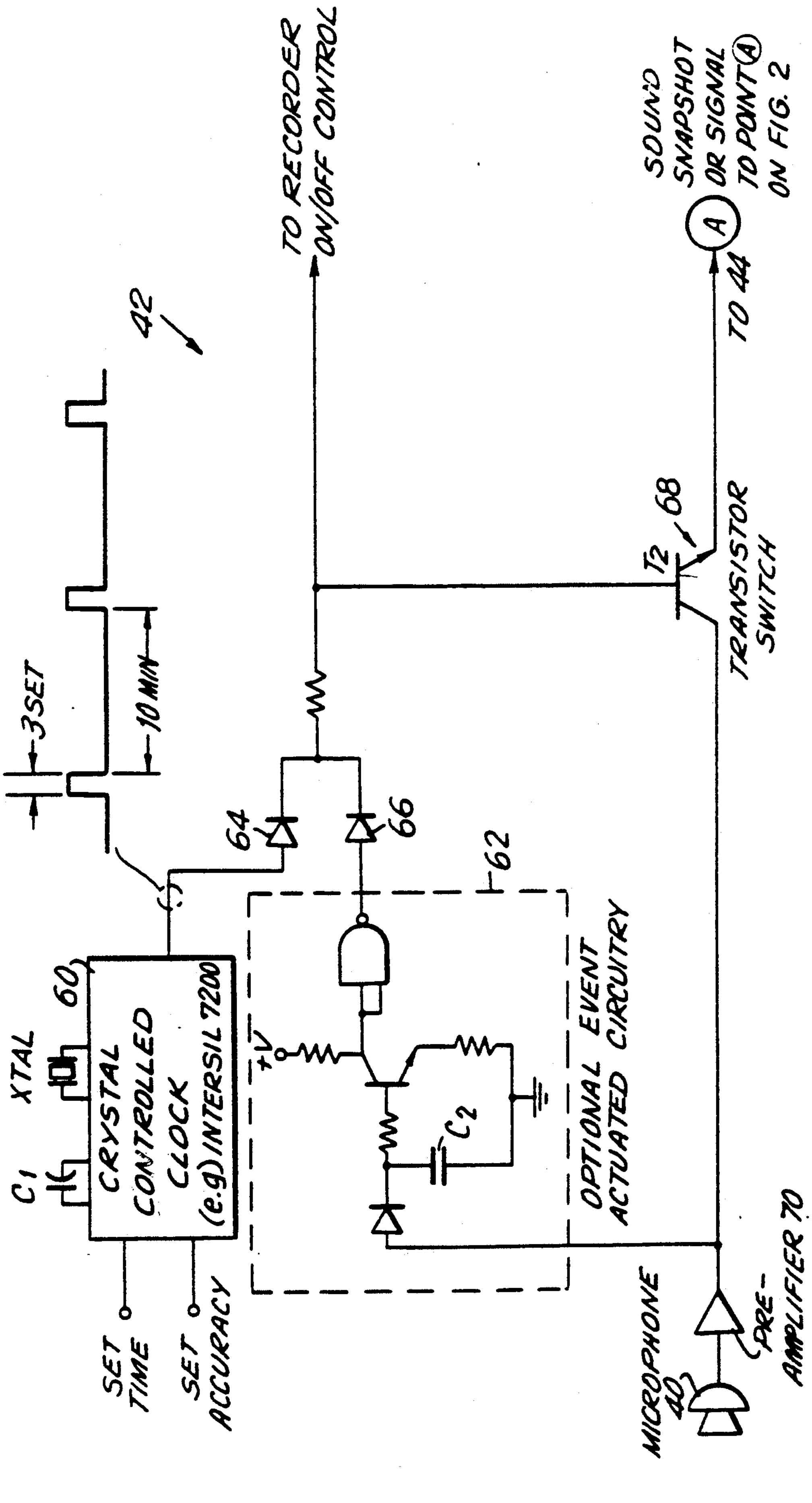
FIG. 4 is a schematic diagram, partially in block, of a sampling circuit capable of providing the audio snapshot sampling window employed in the presently preferred method of the present invention.

Referring now to FIG. 4, the sampling circuitry 42 is shown in greater detail. This sampling circuitry 42 is preferably adjustable so as to provide a presettable or event driven sample of microphone sound. For example, in radio or TV audience preference measurement in connection with an audience survey, it might be desirable to record 3 seconds of ambient sound at preordained or predetermined 5 minute intervals to provide an audio snapshot of the radio and/or television listening audience at that location at the various diverse locations where respondents are for later comparison to synchronized master recordings of the known radio and/or television program material playing in that area at the sampled time. In this way, listener or TV-viewing behavior is determined. As shown and preferred in FIG. 4, the sampling circuitry 42 preferably includes a conventional crystal controlled clock 60, such as an Instersil 7200 and, if desired, event actuated circuitry 62, which basically is a gating circuit whose output, together with that of clock 60, is provided in parallel through diode pair 64–66 to the base of a transistor switch 68, whose output is connected to the input of frequency classification circuit 44, with the base being connected in parallel to the recorder on/off control. As also shown and preferred, a conventional preamplifier 70 may be used with microphone 40.

Figure 5:
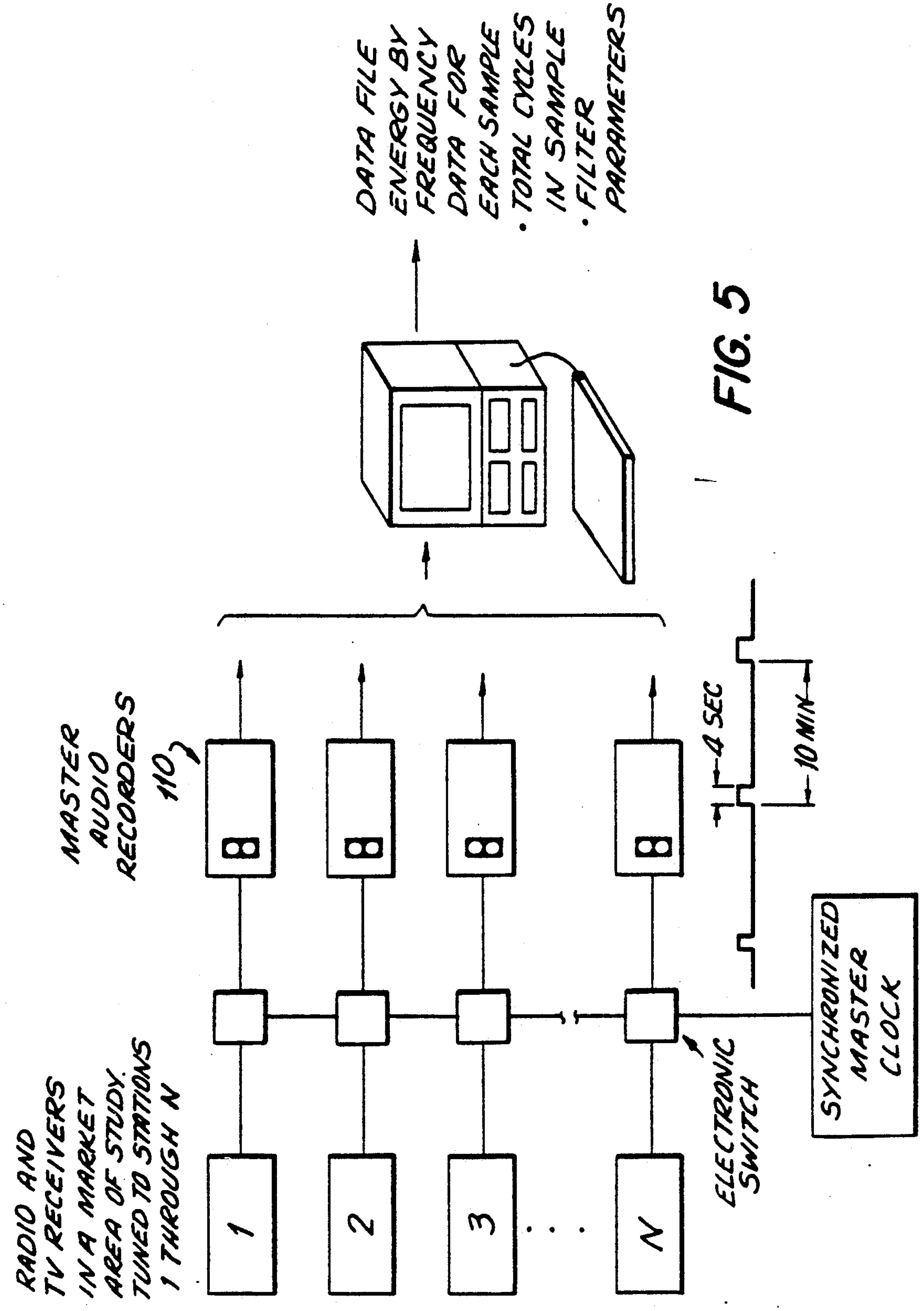
FIG. 5 is a diagrammatic illustration of the accumulative processing of the presently preferred method of the present invention.
Figure 6:
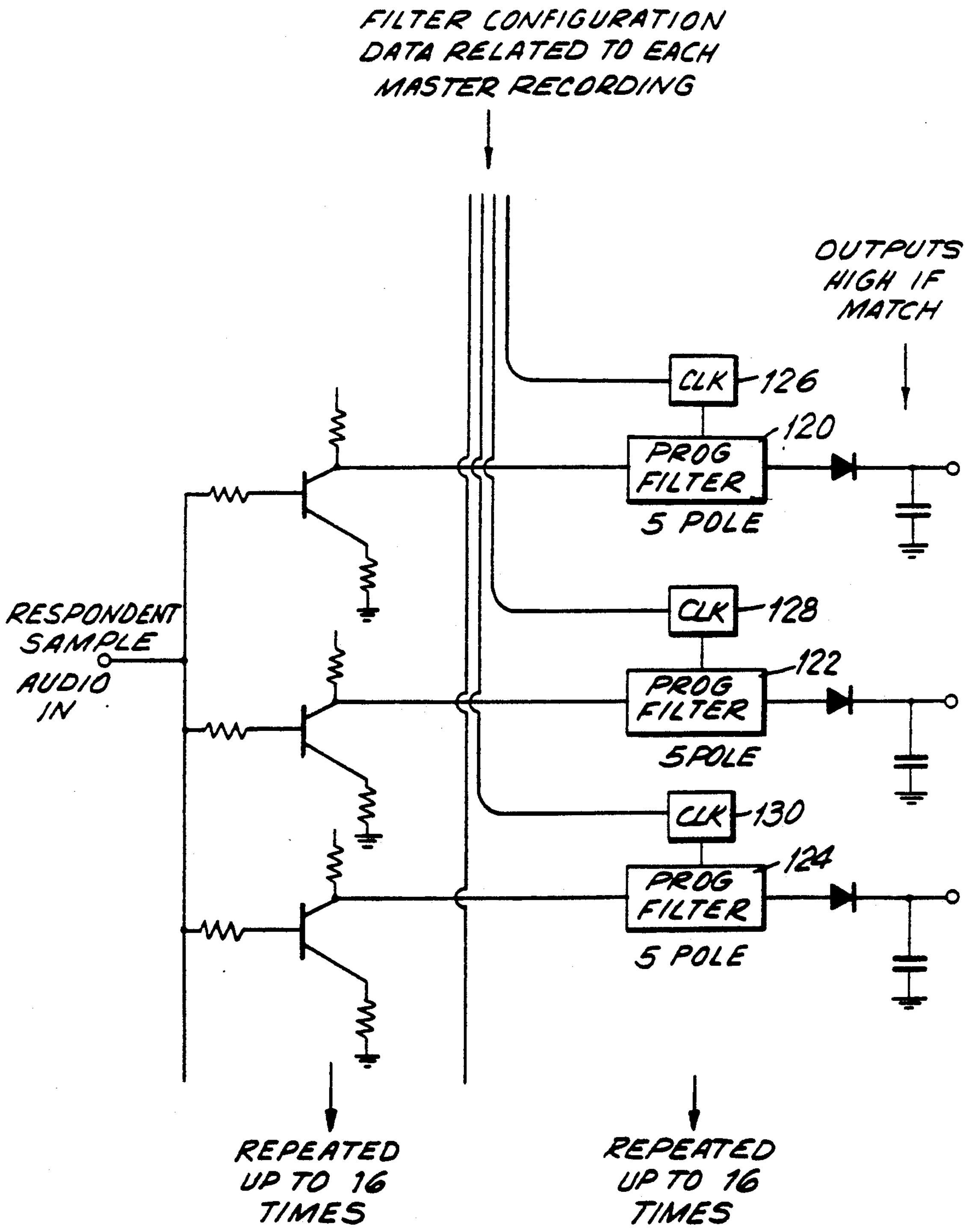
FIG. 6 is a schematic diagram, partially in block of the band pass filter array used in matching respondent samples against a master in accordance with the presently preferred method of the present invention.
Figures 7, 9:
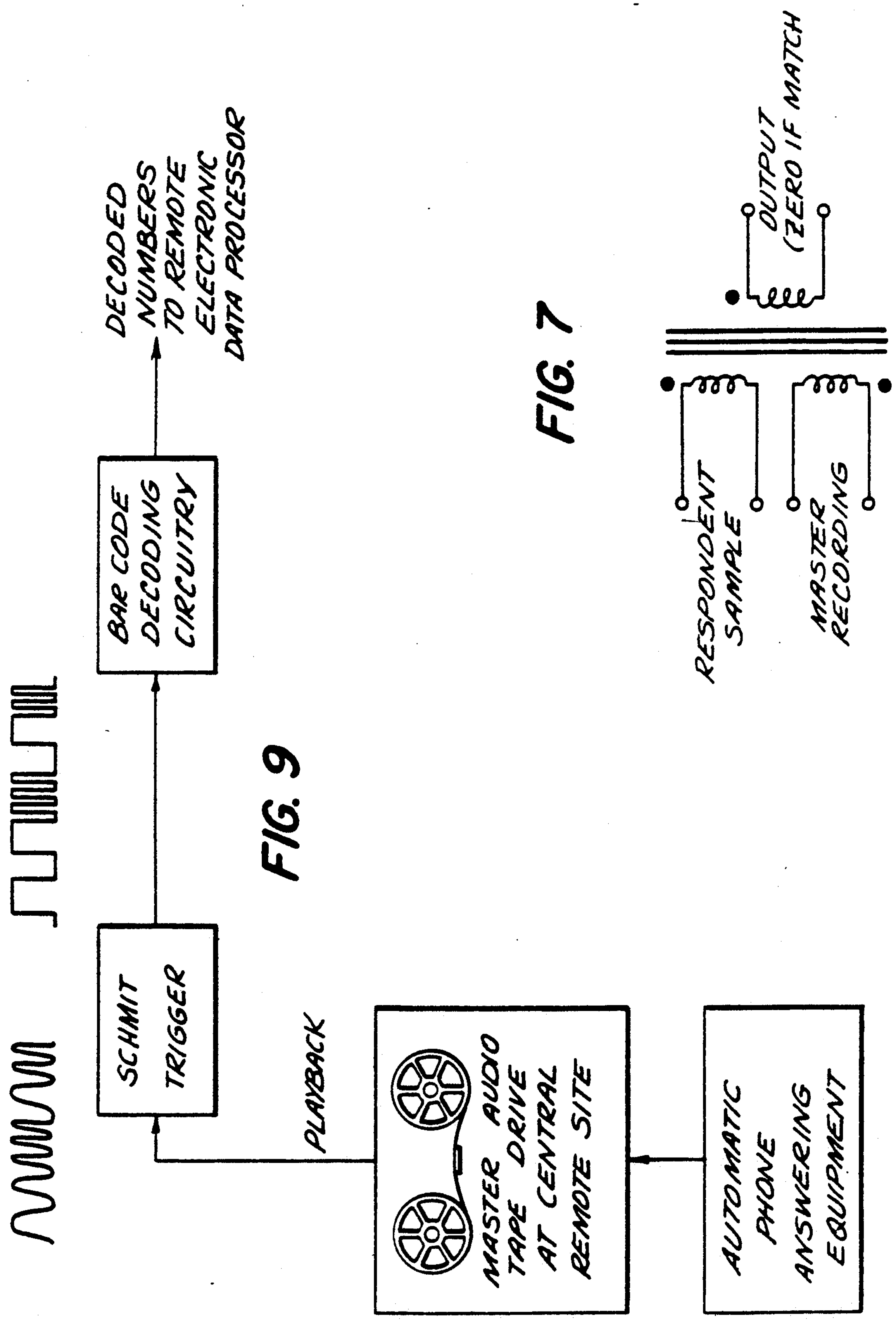
FIG. 7 is a schematic diagram of a typical circuit capable of confirming matching in accordance with the presently preferred method of the present invention.
FIG. 9 is a block diagram of a procedure for decoding bar code audio signatures in accordance with the presently preferred method of the present invention.

In accordance with the presently preferred method of the present invention, matching of respondent audio samples to the synchronized master recording of known material is preferably performed by a combination of three steps as described below. First, the "sound snapshots", such as the 3 second example, are preferably recorded at diverse respondent locations 100, 102, 104 and, when desired, are transmitted over phone lines, or by radio (HF, VHF, UHF or microwave) links 106 to a remotely located audio recording tape drive, typically at the central processing site 108, such as diagrammatically illustrated in FIG. 2. Secondly, the master recordings of known program material being aired in the market of interest are preferably classified and analyzed. These master recordings 110 will have preferably been synchronized with the diverse respondent "sound snapshots," an important difference being however, that the master recordings 110 preferably start a little before and end a little later than the diverse respondent recordings. For example, the master recordings might be 4 seconds long, on say 10-minute intervals, and the respondent recordings might be 3 seconds long in the above example. In this way the master recording 110 will be sure to enclose the entire time window of the diverse respondent recordings. Typically up to 150 master recordings might be made in a market area of interest during a study, relating to, say, 150 radio/TV stations' programming (or other ambient sounds of interest). The master recordings 110 are preferably classified and analyzed by means of a conventional Fast Fourier Transform program and system, which can be PC-based, such as the "Waveform Analyst" as supplied by LeCroy Corporation of Spring Valley, NY. In addition to outputting a data file containing the sample's energy level at each frequency (in the range of 300HZ to 3000HZ), special conventional computer programs also can provide data about the number of cycles (a.c. sine wave cycles of any frequency) in each sample. Moreover, conventionally a special program can, based on the energy/frequency data just mentioned, compute filter parameters and store such parameters as a data file to be used as will be explained. Such a typical master recording scheme for recording, classifying and analyzing "sound snapshots" is diagrammatically illustrated in FIG. 5. Thirdly, then, the filter parameters derived above, are preferably used in the presently preferred method of the present invention to configure conventional switching capacitor filters, such as an MF10 making up 5-pole band pass filters 120, 122, 124, each configured, in an array, to correspond to the frequency "signature" determined above for each master sample, as shown and preferred in FIG. 6. Such switched capacitor filters 120, 122, 124 can have their pass-bands dynamically adjusted by means of controlling clock frequencies 126, 128, 130 associated with each filter element 120, 122, 124. The data determined by the Fast Fourier Transform applied to the master recordings 110 is preferably used to set these filter clocks 126, 128, 130. The diverse respondent samples are preferably passed through the array of filters 120, 122, 124 (configured for the relevant sample period) and, due to the fact that the filter array 120, 122, 124 has preferably been tailored so that known sections of it correspond on a 1-to-1 basis with the known master "signatures," the diverse respondent samples preferably drop through to specific output points, the monitoring of which thus determines the classification result and matches the diverse respondent sample to the master sample. Once a match has been tentatively made in this way, it is preferably confirmed by subtracting the sample signal from the master signal to produce a zero output, such as by using the transformer scheme of FIG. 7, with a zero output being produced when a match exists between the respondent sample and the master recording. This same type of approach is preferably also useful in classifying, analyzing and reporting on the audio data collected in the other modules of the data acquisition device 20.

Thus, individual respondents at diverse locations, who may wear individual audio recorders or the described data acquisition device 20, will have their listening behavior automatically sampled at periodic intervals, with these samples, or individual audio recordings, synchronized to a master recording of all of the programming being surveyed so that a match of audio snapshots can be sought at the central location to which the audio recordings are transmitted for purposes of generating an audience survey in accordance with the presently preferred method of the present invention. In this regard, it should be noted that preferably the sampling interval or window is short so as to obtain discrete samples since too large a window would produce an indication of the average of program material surveyed rather than discrete samples. In addition, preferably, the matched samples may be sorted, as a pre-processing step, at the central location so as to optimize the match of the frequency intervals of the master recording samples against the frequency intervals of the respondent diverse location audio samples.

Figure 8:
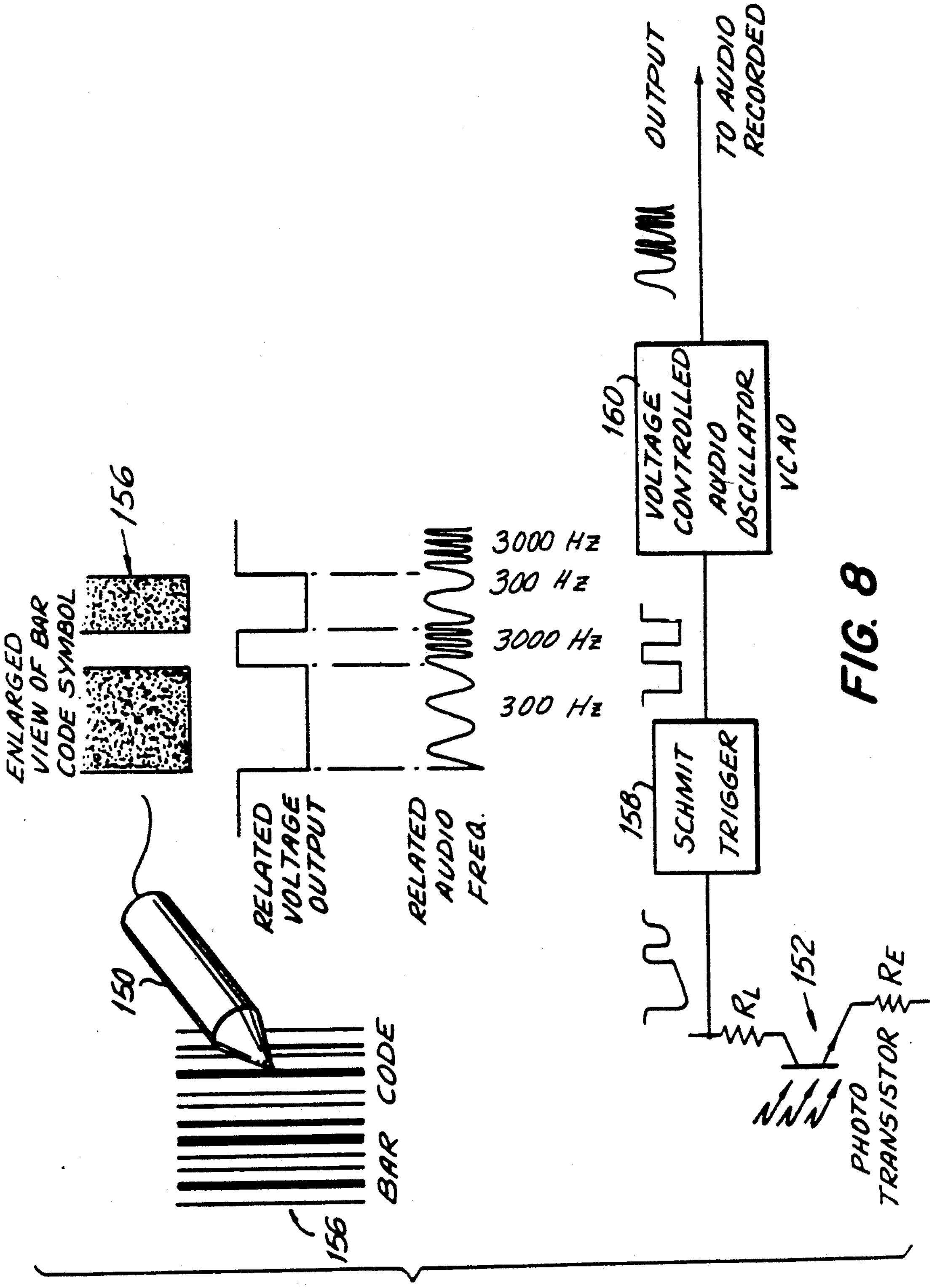
FIG. 8 is a diagrammatic illustration of a procedure for obtaining an audio signal from a bar code scan in accordance with the presently preferred method of the present invention.
Figure 15:
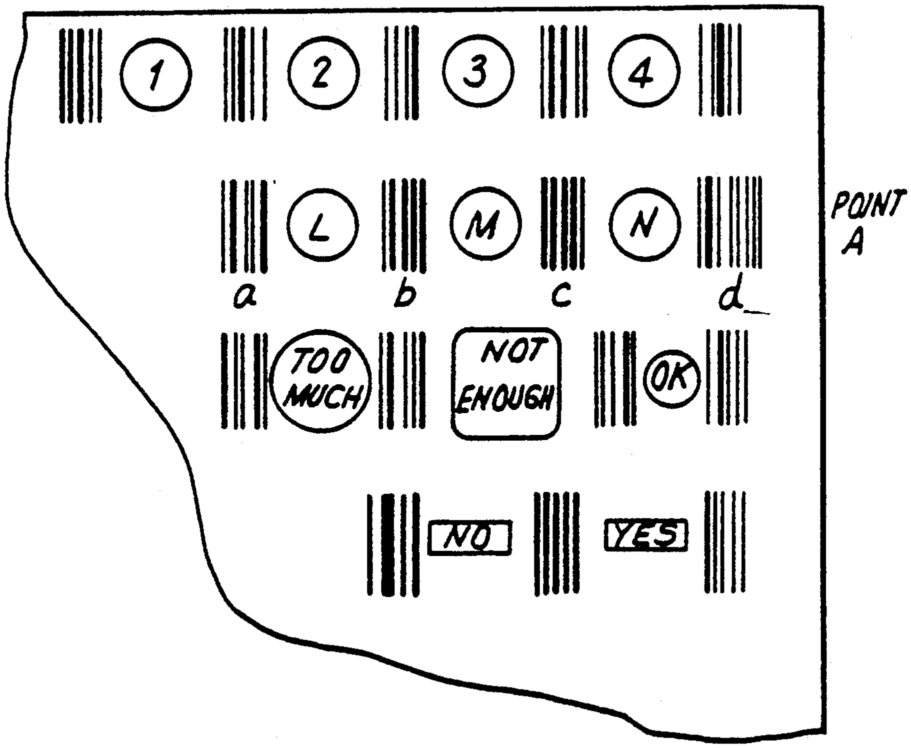
FIG. 15 is a diagrammatic illustration of a typical bar code readable data collection form usable with the presently preferred method of the present invention.
Figure 16:
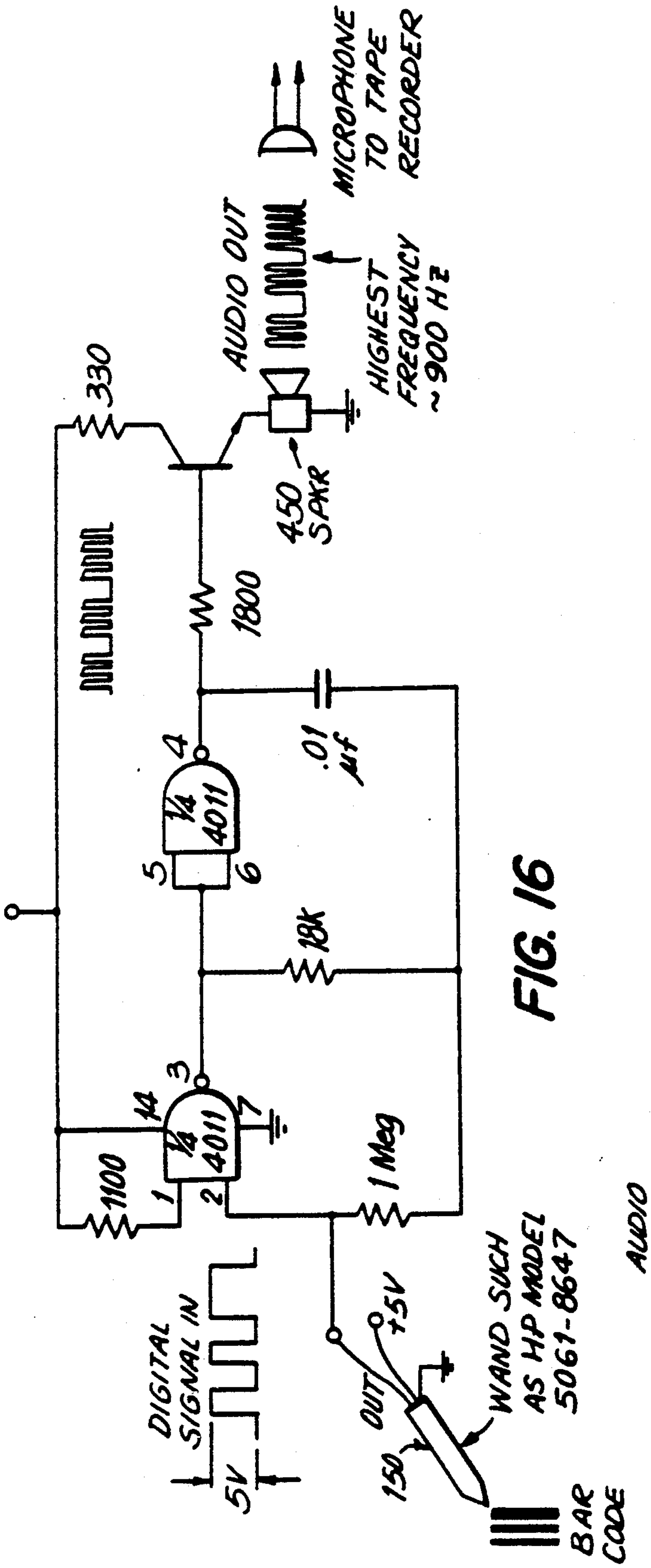
FIG. 16 is a schematic illustration, partially diagrammatic, of a typical digital to audio conversion circuit for providing scanned bar code data as audio signals in accordance with the presently preferred method of the present invention.
Figure 17:
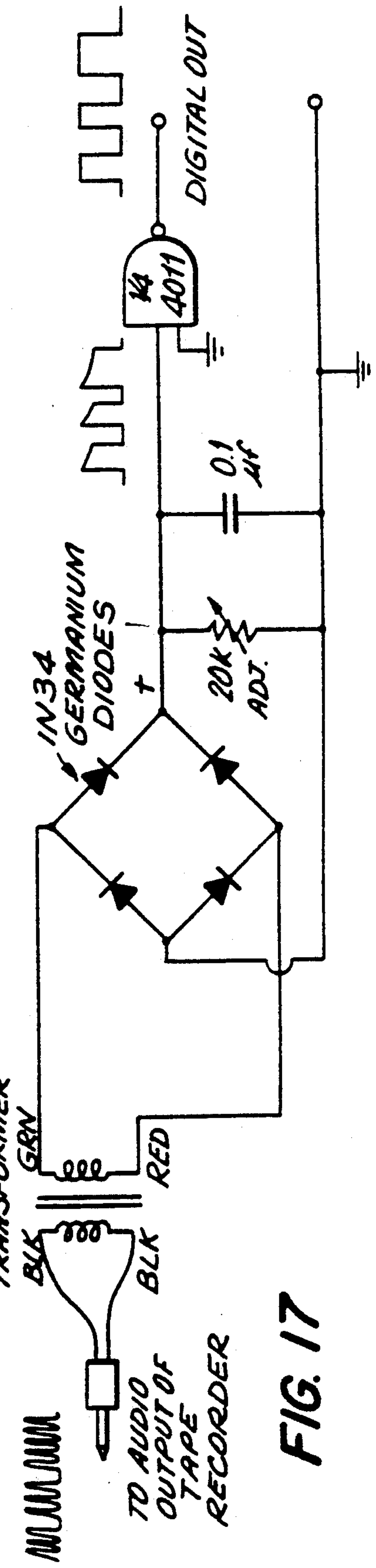
FIG. 17 is a schematic illustration, partially in block, of a typical circuit for reconverting the bar code data audio output from the circuit of FIG. 16 into digital data in accordance with the presently preferred method of the present invention.

As shown and preferred in FIG. 1, the data acquisition device 20 also preferably includes a bar code wand sensor module 24 and bar code reader 150 for providing supplementary market survey data to the central location in the form of audio recordings of the bar code scan, such as of a UPC type product code. The bar code wand sensor 24 preferably utilizes a conventional light emitting diode and photo-transistor receptor 152 having an output current determined by the amount of light emitting diode light reflected from a bar code symbol 156, such as illustrated in FIG. 8. The output current in the photo-transistor 152 preferably varies depending on the amount of light reflected. This output current is preferably applied to the input resistor to a voltage controlled audio oscillator 160 (VCAO) through a conventional Schmitt trigger 158, with oscillator 160 preferably producing an audio signal related in frequency to the reflectance of the bar code 156 or other surface. The circuit constants are preferably chosen so as to produce a frequency of 300 Hz from a black surface and 3,000 Hz from a white surface, assuming the frequency ranges referred to above for determining listening audience, so as to enable a single device 20 to provide a unified accumulative survey response of audience listening preference and other market survey preferences from recorded audio signals at the diverse respondent locations. When the bar code wand 150 is moved across the bar code symbol 156, say at a rate of from 3 to 30 inches per second, by way of example, the audio "signature" of the bar code 156 is preferably produced by oscillator 160 and is recorded on the recording medium, such as magnetic tape, or transmitted. By selectively interposing light filters or selectively turning off LED light sources of differing output light colors, a different signal corresponding to different surface colors can be produced. Generally, however, the particular color is not needed; in which case only the bar code 156 or some other image is recorded by this module 24. As shown and preferred, by way of example, in FIG. 9, upon playback, the audio signal may be re-digitized and processed in the normal way at the remote (central) electronic data processor, such as by having a table look up relating the bar code audio signatures to the digital bar code equivalent. As further shown and preferred in FIGS. 16 and 17, circuitry for converting the digital bar code scan into audio signals is shown, by way of example (FIG. 16), as is circuitry for reconverting the recorded audio signal which has been transmitted to the central location 108 back into the digital equivalent of the scanned bar code (FIG. 17). The circuit of FIG. 16 assumes, by way of example, the use of a conventional bar code wand 150 such as an HP Model 5061-8647. FIG. 15, by way of example, illustrates a typical bar code readable data collection form, with the bar code numbers preferably being chosen to uniquely define each location, such as 01, 01 to 99, 99, which would define a matrix of 99×99. In use with this form the bar code wand 150 is preferably scanned right to left, starting with the chosen response area. In the example of FIG. 15, if "M" were the chosen answer, the wand 150 would be placed with its tip on "M" and then scanned all the way over to point "A" or, at least past the bar code to designate point "M". The resulting signal, which contains the bar code data at "c" and "d", are preferably processed or tape recorded for later transmission and/or decoding.

Figure 10:
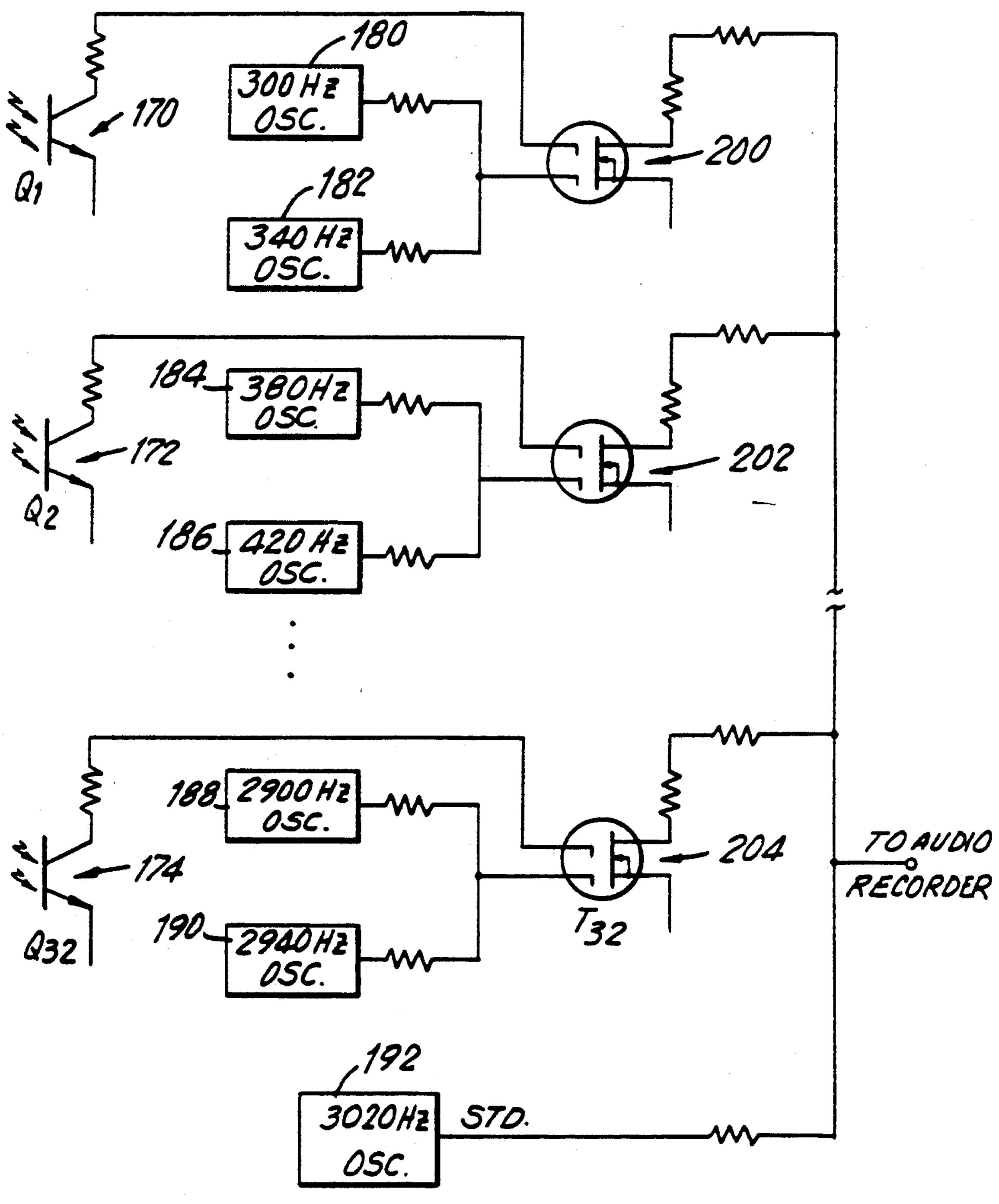
FIG. 10 is a schematic diagram, partially in block, of macro imager circuits usable with the presently preferred method of the present invention.

In addition to the bar code audio input from sensor 24 and the audio snapshot from sensor 22, audio information is also collected by the macro imager sensor module 28. This macro imager sensor module 28 is preferably comprised of a hand-held or otherwise mounted bar (the "macro data bar") which comprises a line of phototransistors 170, 172, 174, by way of example (FIG. 10) which is passed over large images of up to 12" in width to produce a complex audio frequency signature. For example, if an automobile license plate is scanned, its audio signature can later be decoded to reproduce an image corresponding to the original license number image. In order to accomplish this, the "macro data bar" preferably utilizes a specific pair of unique audio frequency base signals for each of the individual phototransistors 170, 172, 174. The amplitude of the audio frequencies is preferably varied by each photo-transistor circuit 170, 172, 174 depending on the reflected light level sensed. There are preferably 32 individual phototransistors in the "macro data bar," with only three such photo-transistors 170, 172, 174 being illustrated in FIG. 10. The first photo-transistor 170 preferably modulates a frequency pair of 300 Hz and 340 Hz provided from oscillators 180, 182. The second one, photo-transistor 172, preferably modulates a frequency pair of 380 Hz and 420 Hz from oscillator 184, 186. Similarly, 40 Hz steps are preferably used up to the 32nd photo-transistor 174 which preferably modulates a 2,900 Hz and 2,940 Hz frequency pair from oscillators 118, 190. In addition, a 3,020 Hz time standard signal from an oscillator 192 is preferably recorded continuously. The 3,020 Hz signal preferably allows for frequency "correction" at decoding time. As shown and preferred, each frequency pair is supplied to a dual gate FET, with dual FET 200, 202 and 204, respectively, being illustrated in FIG. 10. The macro-imager signature is preferably decoded using Fast Fourier Transform analysis of the signal, and cascaded electronic filters which separate the individual data inputs by classifying the frequency of the signals received. To facilitate this operation, certain subgroups within the photo-transistor array may preferably be recorded on separate channels of the recording media and each channel preferably transmitted or stored separately. For other applications, all frequencies are preferably mixed on one tape.

Referring now to the data tablet sensor module 26, which is described in the aforementioned copending application, and which is illustrated in greater detail in FIGS. 11-14, and FIG. 18, the data tablet sensor module 26 is preferably comprised of a flat or curved working surface 210 of approximately 10"×12" that accommodates an ordinary 8½"×11" piece of ordinary paper, such as a market survey questionnaire, a data entry or data collection source form, or any other information collection document. The document normally indicates places for making the desired responses on certain areas of the form.

Figure 11:
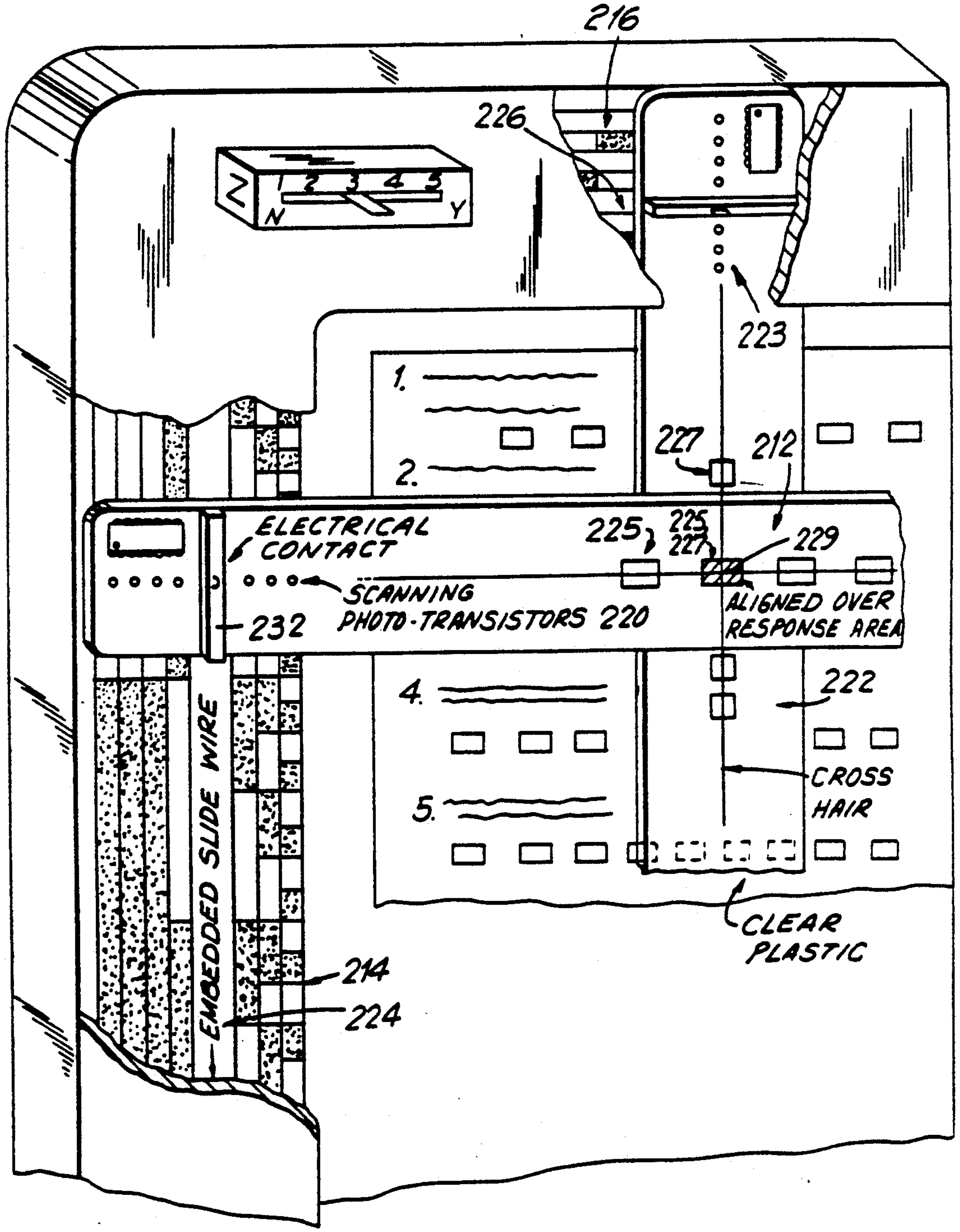
FIG. 11 is a cutaway diagrammatic illustration of a data tablet sensor usable in the device of FIG. 1.
Figure 12:
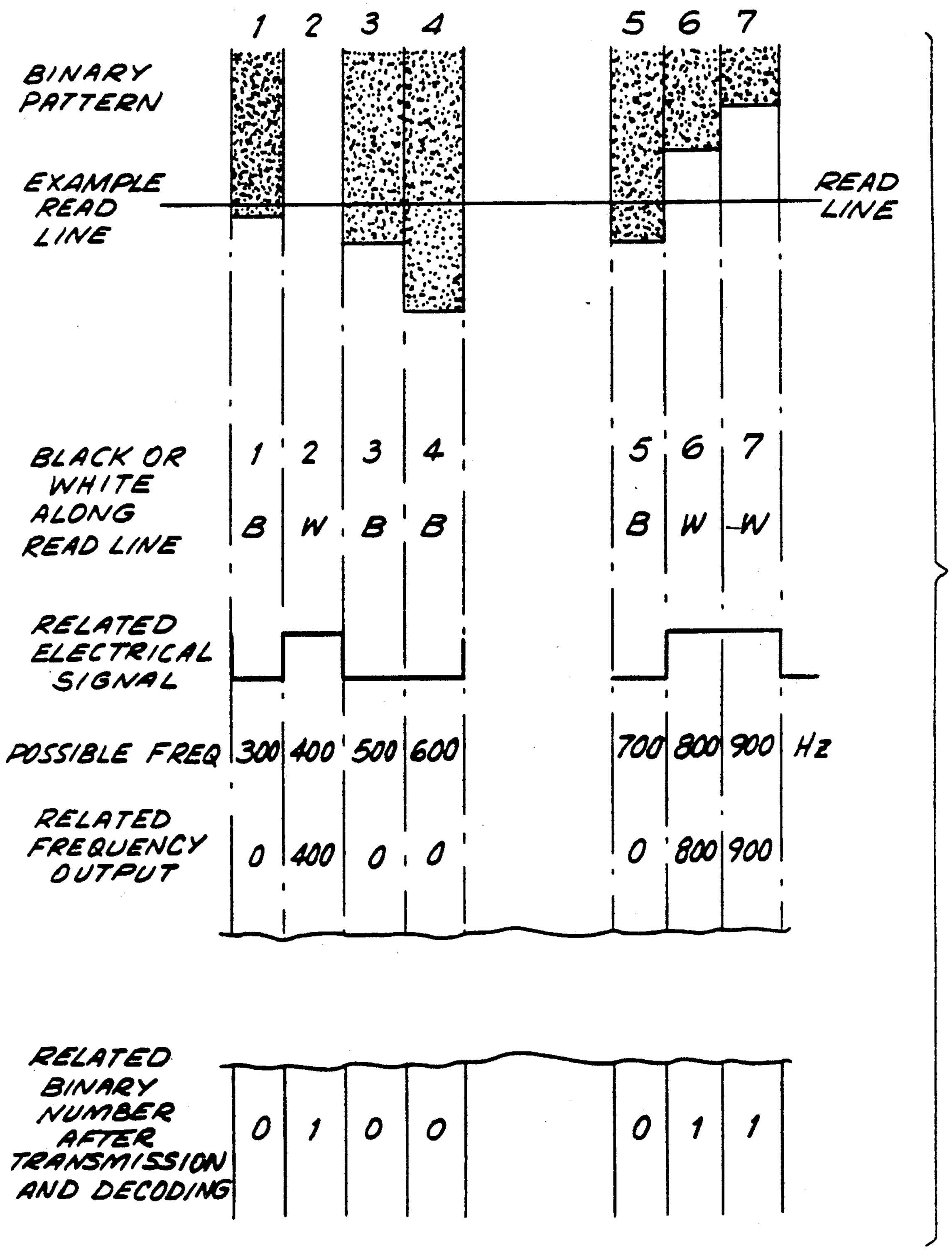
FIG. 12 is a diagrammatic illustration of the data output circumstances of the sensor of FIG. 11.
Figure 13:
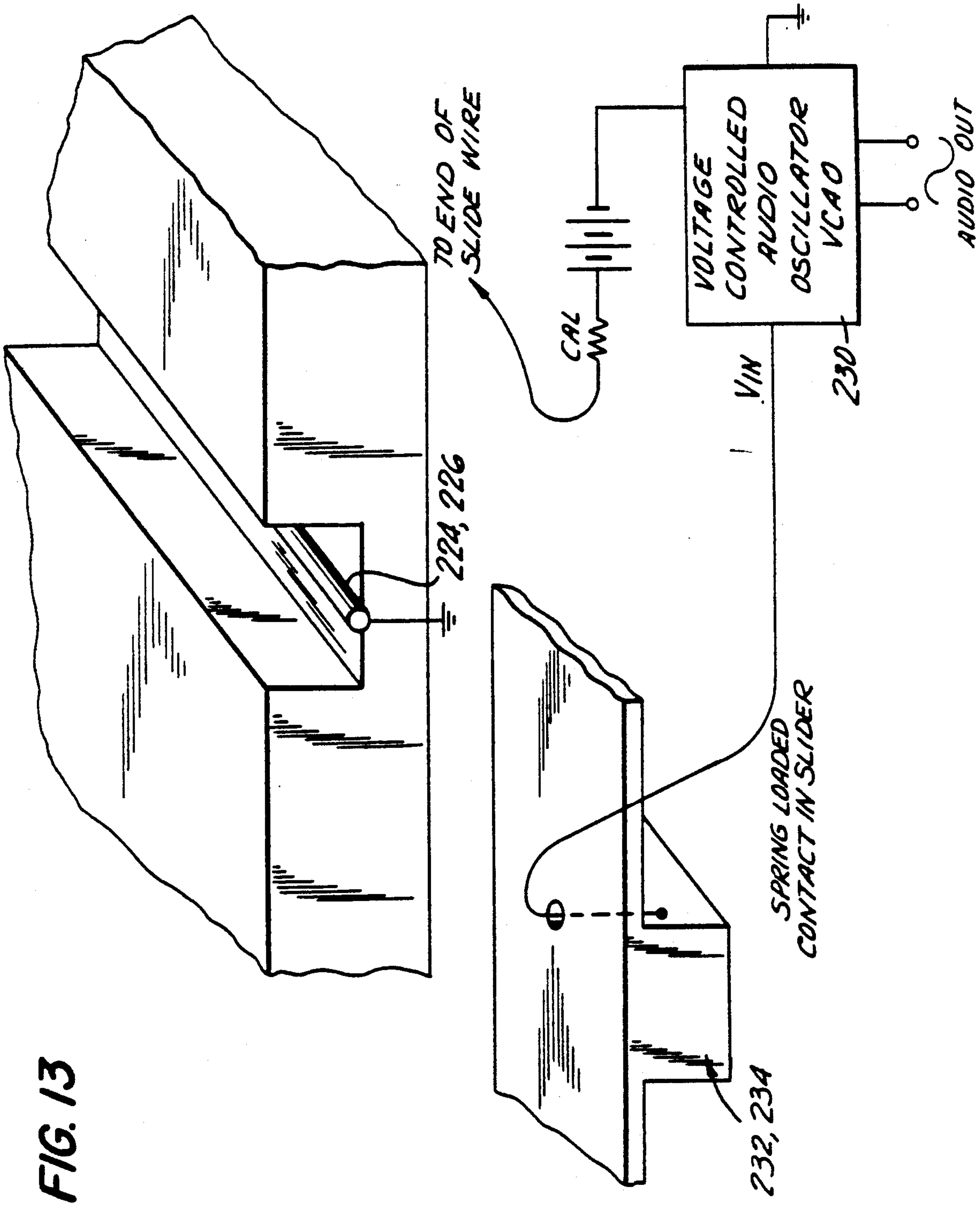
FIG. 13 is a diagrammatic illustration of a slide wire as a position sensor usable with the presently preferred method of the present invention.
Figure 18:
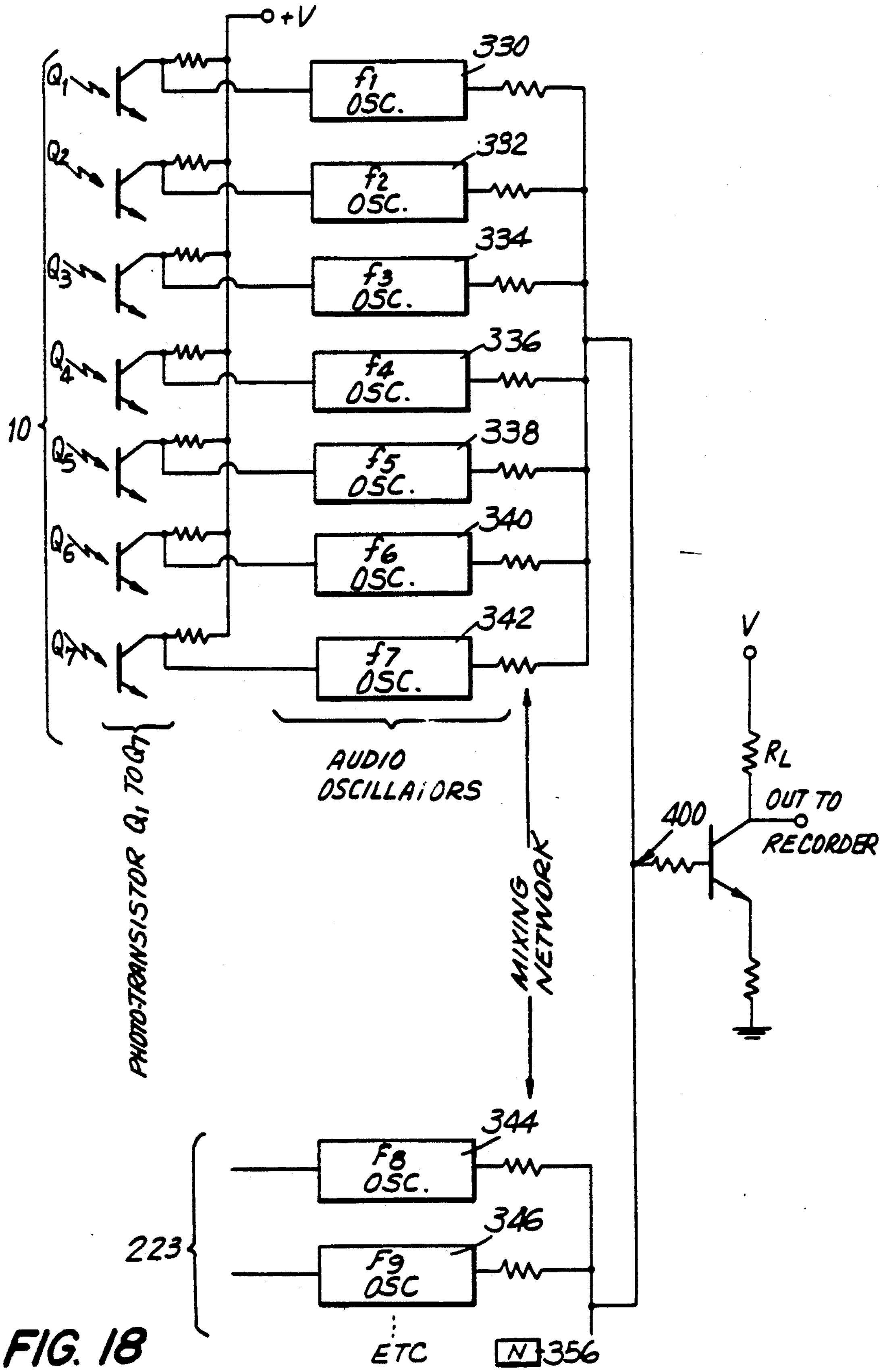
FIG. 18 is a schematic diagram, partially in block, of a typical preferred audio conversion circuit for use in the data tablet sensor of FIG. 11 for providing audio signatures from marked data responses.

A movable cursor 212, 222 is preferably used that produces an audio signature indicating both its position and relative motion in any of three axes, say x, y or z, such as shown in FIGS. 11 and 18. The cursor 212, 222 is preferably mechanically connected to shaded bars 214 along the side (y-coordinate) and top 216 (x-coordinate) of the tablet 26 which cause a composite of audio frequencies to be produced. The x-axis markings provide a binary pattern that is "read" by photo-transistors 220, that are either off for black bars or on for white or clear bars and the y-axis markings provide a binary pattern that is "read" by photo-transistors 223. There are preferably 7 possible black/white bar areas along the top and the side, giving a possibility of 128 specific locations along either axis, such as illustrated in FIG. 12. The seven photo-transistors 220 along the x-axis each correspond to one of seven unique frequencies between 300 Hz and 1,000 Hz that are spaced 100 Hz apart. Similarly, the y-axis photo-transistors 223 produces a simultaneous pattern of seven unique frequencies between 1,100 Hz and 1,800 Hz that are spaced 100 Hz apart. FIG. 18 illustrates a presently preferred typical audio conversion circuit usable with the photo-transistors 220,223. As shown and preferred in FIG. 18, each of the transistors Q1-Q7 comprising transistors array 220, and transistors 8Q-Q14 comprising transistors array 223 is associated with a different voltage controlled audio oscillator 330 through 342, and 344 through 356, with the selected outputs being mixed together to provide a composite audio frequency which is ultimately summed at point 400 from which it can be recorded.

Figure 14:
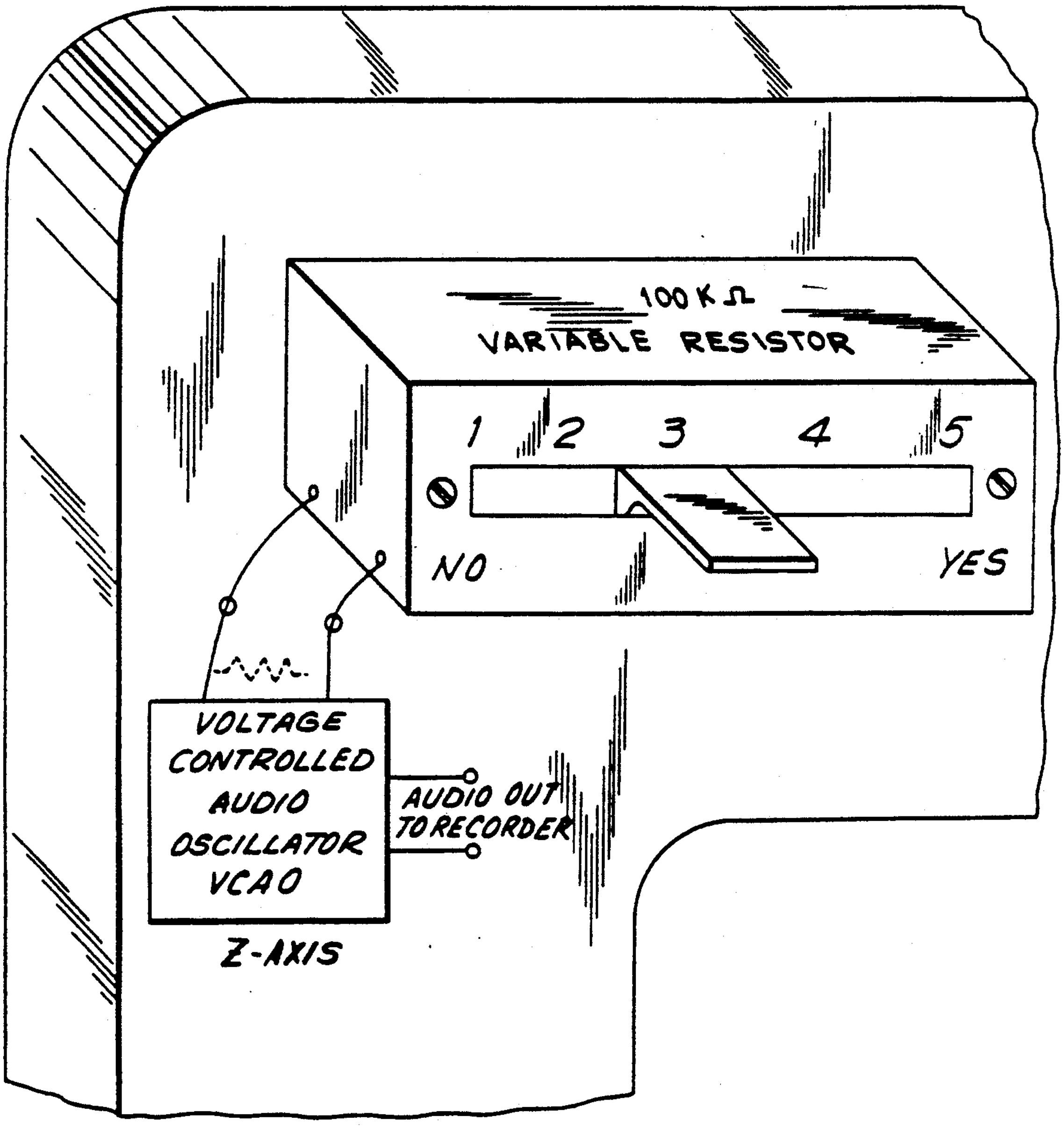
FIG. 14 is a diagrammatic illustration of a device for providing Z-axis data via a variable resistor for use with the presently preferred method of the present invention.

A specific x-y position is determined by moving the x and y members 212, 223 until their windows 225, 227 respectively, are aligned and intersect over a marked response area 229. After a specific x-y position is determined, the Data Tablet Sensor Module 26 can preferably momentarily be put into an "expand resolution mode" by switching the x-y position sensor momentarily to a resistance slide wire pick-up 224, 226 (see FIG. 13) on the x and y axes. This provides a higher resolution surface in the vicinity of the x-y position that was previously determined on the surface which graphical data including handprint, handwriting and other symbols can be recorded as audio signals. A voltage proportional to the position along the slide wires 224, 226 is preferably converted into an audio "image" via a conventional voltage controlled audio oscillator 230 (VCAO). The output is then preferably transmitted or stored. The audio signals are subsequently reconverted into the original tracing or movement of the cursor. In this high resolution mode of operation, this module can collect open ended responses to questions, or other symbols, tracings, shapes and so forth. Similarly, sensors for a third dimension can be added to the data tablet 26 to record additional data as shown in FIG. 11. Thus, an additional response on the z axis that is associated with any x-y coordinate point indicating an answer to a given survey question can be recorded, such as the value $1.25, or related additional "yes" or "no", such as illustrated in FIG. 14.

Thus, by utilizing the presently preferred method of the present invention, audio frequency information can be used to capture various types of audience preferences, such as a listening audience survey for radio and/or television program, as well as other supplementary market survey data. In this regard, if desired, for example, each respondent may merely be provided with a portable microcassette tape recorder, synchronized to the master recordings, as opposed to the complete data acquisition device 20, to obtain listening audience data in accordance with the present invention without departing from the spirit and scope hereof.

What is claimed is:

1. A method for obtaining market survey data from a plurality of diverse locations for accumulative processing by a remote data processor at a central location, said method comprising the steps of:

recording a plurality of audio signals at each of said diverse locations which correspond to predetermined market survey data categories associated with a respondent at each of said diverse locations;

providing said plurality of audio signals from said diverse locations to said remote data processor;

accumulatively processing said provided plurality of audio signals at said central location for providing an accumulatively processed survey report corresponding to said market survey data categories, said accumulative processing step comprising the step of converting said provided audio signals into data categories for providing said accumulatively processed survey report; said audio signal recording step comprising the steps of bar code scanning a bar code of market survey data, generating an audio signal therefrom, and recording said generated audio signal at said diverse location; and providing a master audio signal recording at said central location of ambient sounds corresponding to the audio outputs of a predetermined plurality of different radio and/or television channels to be surveyed for said listening audience survey, said master audio signal recording being synched to said diverse location audio signal recording for recording said ambient sounds corresponding to said audio outputs by said master recording at substantially the same regular discrete predetermined sampling intervals as at said diverse locations for providing a substantially like plurality of spaced apart sampling windows over said predetermined measurement intervals; whereby a unified accumulative survey response to audience listening preference and other market survey preferences may be provided from recording audio signals at said plurality of diverse locations.

2. A method in accordance with claim 1 wherein said step of providing sampling audio windows comprises the step of providing sampling windows of short duration with respect to said predetermined measurement interval.

3. A method in accordance with claim 1 wherein said converting step comprises the steps of performing a Fast Fourier Transform on said recorded master audio signal samples, and sample analyzing said master audio signal recording.

4. A method in accordance with claim 3 wherein said converting step further comprises the step of dividing said master audio recording samples into discrete frequency intervals.

5. A method in accordance with claim 4 wherein said accumulative processing step further comprises the step of matching the frequency intervals of said master audio recording samples against the frequency intervals of said diverse location audio samples from said recorded sample audio sound windows.

6. A method in accordance with claim 5 wherein said accumulative processing step further comprises the step of confirming said matched samples to ensure said matching thereof.

7. A method in accordance with claim 6 wherein said matching step further comprises the step of sorting said plurality of matched samples for optimizing said match.

8. A method in accordance with claim 8 wherein said step of providing sampling audio windows comprises the step of providing sampling windows of short duration with respect to said predetermined interval.

9. A method in accordance with claim 5 wherein said step of providing sampling audio windows comprises the step of providing sampling windows of short duration with respect to said predetermined interval.

10. A method for obtaining market survey data from a plurality of diverse locations for accumulative processing by a remote data processor at a central location, said method comprising the steps of:

recording a plurality of audio signals at each of said diverse locations which correspond to predetermined market survey data categories associated with a respondent at each of said diverse locations;

providing said plurality of audio signals from said diverse locations to said remote data processor;

accumulatively processing said provided plurality of audio signals at said central location for providing an accumulatively processed survey report corresponding to said market survey data categories, said accumulative processing step comprising the step of converting said provided audio signals into data categories for providing said accumulatively processed survey report; said audio signal recording step comprising the steps of bar code scanning a bar code of market survey data, generating an audio signal therefrom, and recording said generated audio signal at said diverse location; said audio signal recording step further comprising the step of recording ambient sounds at said diverse location at regular discrete predetermined sampling intervals for providing a plurality of spaced apart sampling audio sound windows over a predetermined measurement interval; said ambient sound recording step comprising the step of recording radio and/or television audio ambient sounds at said diverse locations for providing an audio snapshot of said radio and/or television listening audience at said diverse location; said market survey data categories comprising an audience survey; and providing a master audio signal recording at said central location of ambient sounds corresponding to the audio outputs of a predetermined plurality of different radio and/or television channels to be surveyed for said listening audience survey, said master audio signal recording being synched to said diverse location audio signal recording for recording said ambient sounds corresponding to said audio outputs by said master recording at substantially the same regular discrete predetermined sampling intervals as at said diverse locations for providing a substantially like plurality of spaced apart sampling windows over said predetermined measurement intervals.

11. A method for obtaining market survey data from a plurality of diverse locations for accumulative processing by a remote data processor at a central location, said method comprising the steps of:

recording a plurality of audio signals at each of said diverse locations which correspond to predetermined market survey data categories associated with a respondent at each of said diverse locations;

providing said plurality of audio signals from said diverse locations to said remote data processor;

accumulatively processing said provided plurality of audio signals at said central location for providing an accumulatively processed survey report corresponding to said market survey data categories, said accumulative processing step comprising the step of converting said provided audio signals into data categories for providing said accumulatively processed survey report; said audio signal recording step comprising the steps of bar code scanning a bar code of market survey data, generating an audio signal therefrom, and recording said generated audio signal at said diverse location; said audio signal recording step further comprising the step of automatically recording ambient sounds at said diverse locations at regular discrete predetermined sampling intervals for providing a plurality of spaced apart sampling audio sound windows over a predetermined measurement interval, said regular discrete predetermined sampling intervals comprising discrete predetermined clock intervals; said ambient sound recording step comprising the step of recording radio and/or television audio ambient sounds at diverse locations for providing an audio snapshot of said radio and/or television listening audience at said diverse location; said market survey data categories comprising an audience survey; and providing a master audio signal recording to said central location of ambient sounds corresponding to the audio outputs of a predetermined plurality of different radio and/or television channels to be surveyed for said listening audience survey, said master audio signal recording being synched to said diverse location audio signal recording for recording said ambient sounds corresponding to said audio outputs by said master recording at substantially the same regular discrete predetermined sampling intervals as at said diverse locations for providing a substantially like plurality of spaced apart sampling windows over said predetermined measurement intervals.

12. A method in accordance with claim 11 wherein said master audio recording step comprises the step of automatically recording said corresponding ambient sounds at discrete predetermined clock intervals.

13. A method in accordance with claim 12 wherein said step of providing sampling audio windows comprises the step of providing sampling windows of short duration with respect to said predetermined interval.

14. A method in accordance with claim 11 wherein said step of providing sampling audio windows comprises the step of providing sampling windows of short duration with respect to said predetermined interval.

15. A method in accordance with claim 11 wherein said recorded master sampling windows are slightly larger than said recorded diverse location sampling windows.

16. A method in accordance with claim 10 wherein said recorded master sampling windows are slightly larger than said recorded diverse location sampling windows.

17. A method in accordance with claim 1 wherein said recorded master sampling windows are slightly larger than said recorded diverse location sampling windows.

18. A method in accordance with claim 1 wherein said converting step further comprises the step of dividing said master audio recording samples into discrete frequency intervals.

19. A method in accordance with claim 18 wherein said accumulative processing step further comprises the step of matching the frequency intervals of said master audio recording samples against the frequency intervals of said diverse location audio samples from said recorded sample audio sound windows.

20. A method in accordance with claim 19 wherein said matching step further comprises the step of band pass filtering said diverse location audio samples through a band pass filter configured to correspond to a frequency signature for each master audio sample.

21. A method in accordance with claim 19 wherein said accumulative processing step further comprises the step of confirming said matched samples to ensure said matching thereof.

22. A method in accordance with claim 21 wherein said confirming step comprises the step of subtracting said diverse location recording audio samples from said master recording audio samples for seeking a zero output, said zero output confirming a match.

23. A method for obtaining market survey data from a plurality of diverse locations for accumulative processing by a remote data processor at a central location, said method comprising the steps of:

recording a plurality of audio signals at each of said diverse locations which correspond to predetermined market survey data categories associated with a respondent at each of said diverse locations;

providing said plurality of audio signals from said diverse locations to said remote data processor;

accumulatively processing said provided plurality of audio signals at said central location for providing an accumulatively processed survey report corresponding to said market survey data categories, said accumulative processing step comprising the step of converting said provided audio signals into data categories for providing said accumulatively processed survey report; said audio signal recording step comprising the steps of bar code scanning a bar code of market survey data, generating an audio signal therefrom, and recording said generated audio signal at said diverse location; said audio signal recording step further comprising the step of recording ambient sounds at said diverse location at regular discrete predetermined sampling intervals for providing a plurality of spaced apart sampling audio sound windows over a predetermined measurement interval; said recording of said ambient sounds at said diverse location comprising the step of recording said ambient sounds on an individually worn portable recorder associated with said respondent at said diverse location; said ambient sound recording step further comprising the step of recording radio and/or television audio ambient sounds at said diverse locations for providing an audio snapshot of said radio and/or television listening audience at said diverse locations; said market survey data categories comprising an audience survey; and providing a master audio signal recording at said central location of ambient sounds corresponding to the audio outputs of a predetermined plurality of different radio and/or television channels to be surveyed for said listening audience survey, said master audio signal recording being synched to said diverse location audio signal recording for recording said ambient sounds corresponding to said audio outputs by said master recording at substantially the same regular discrete predetermined sampling intervals as at said diverse locations for providing a substantially like plurality of spaced apart sampling windows over said predetermined measurement intervals.

24. A method for obtaining audience preference market survey data from a plurality of diverse locations for accumulative processing by a remote data processor at a central location for providing an audience survey, said method comprising the steps of recording ambient sounds at said diverse locations at regular discrete predetermined sampling intervals for providing a plurality of spaced apart sampling audio windows over a predetermined measurement interval, said recorded ambient sounds comprising radio and/or television audio ambient sounds at said diverse locations for providing an audio snapshot of a radio and/or television listening audience at said diverse locations;

providing said plurality of recorded audio signals from said diverse locations to said remote data processor;

providing a master audio signal recording at said central location of ambient sounds corresponding to the audio outputs of a predetermined plurality of different radio and/or television channels to be surveyed for said audience survey, said master audio signal recording being synchronized to said diverse location audio signal recording for recording said ambient sounds corresponding to said audio outputs by said master recording at substantially the same regular discrete predetermined sampling intervals as at said diverse locations for providing a substantially like plurality of spaced apart sampling windows over said predetermined measurement intervals and accumulatively processing said provided plurality of audio signals from said diverse locations with said master audio signal recording at said central location for providing an accumulatively processed audience survey report Corresponding to matching of said audience preference market survey data with said master recording.

25. A method in accordance with claim 24 wherein said step of providing sampling audio windows comprises the step of providing sampling windows of short duration with respect to said predetermined measurement interval.

26. A method in accordance with claim 24 wherein said accumulative processing step further comprises the steps of performing a Fast Fourier Transform on said recorded master audio signal samples, and analyzing said master audio signal recording.

27. A method in accordance with claim 26 wherein said accumulative processing step further comprises the step of dividing said master audio recording samples into discrete frequency intervals.

28. A method in accordance with claim 27 wherein said accumulative processing step further comprises the step of matching the characteristics of the signals within the frequency intervals of said master audio recording samples against the characteristics of the signals within the frequency intervals of said diverse location audio samples from said recorded sample audio sound windows.

29. A method in accordance with claim 28 wherein said accumulative processing step further comprises the step of confirming said matched samples to ensure said matching thereof.

30. A method in accordance with claim 29 wherein said matching step further comprises the step of sorting said plurality of matched samples for optimizing said match.

31. A method in accordance with claim 30 wherein said step of providing sampling audio windows comprises the step of providing sampling windows of short duration with respect to said predetermined measurement interval.

32. A method in accordance with claim 28 wherein said step of providing sampling audio windows comprises the step of providing sampling windows of short duration with respect to said predetermined measurement interval.

33. A method in accordance with claim 24 wherein said audio signal recording step comprises the step of automatically recording said corresponding ambient sounds at discrete predetermined clock intervals.

34. A method in accordance with claim 33 wherein said master audio recording step comprises the step of automatically recording said corresponding ambient sounds at discrete predetermined clock intervals.

35. A method in accordance with claim 34 wherein said step of providing sampling audio windows comprises the step of providing sampling windows of short duration with respect to said predetermined measurement interval.

36. A method in accordance with claim 33 wherein said step of providing sampling audio windows comprises the step of providing sampling windows of short duration with respect to said predetermined measurement interval.

37. A method in accordance with claim 33 wherein said recorded master sampling windows are slightly larger than said recorded diverse location sampling windows.

38. A method in accordance with claim 24 wherein said recorded master sampling windows are slightly larger than said recorded diverse location sampling windows.

39. A method in accordance with claim 24 wherein said accumulative processing step further comprises the step of dividing said master audio recording samples into discrete frequency intervals.

40. A method in accordance with claim 39 wherein said accumulative processing step further comprises the step of matching the characteristics of the signals within the frequency intervals of said master audio recording samples against the characteristics of the signals within the frequency intervals of said diverse location audio samples from said recorded sample audio sound windows.

41. A method in accordance with claim 40 wherein said matching step further comprises the step of band pass filtering said diverse location audio samples through a band pass filter configured to correspond to a frequency signature for each master audio sample.

42. A method in accordance with claim 40 wherein said accumulative processing step further comprises the step of confirming said matched samples to ensure said matching thereof.

43. A method in accordance with claim 42 wherein said confirming step comprises the step of subtracting said diverse location recording audio samples from said master recording audio samples for seeking a zero output, said zero output confirming a match.

44. A method in accordance with claim 24 wherein said audio signal recording step comprises the step of recording said ambient sounds at said diverse location on an individually worn portable recorder associated with said respondent at said diverse location.

45. A method in accordance with claim 24 wherein said step of providing said plurality of recorded audio signals from said diverse locations to said remote data processor comprises the step of transmitting said audio signals to said remote data processor via a wired or wireless type link.

46. A method in accordance with claim 45 wherein said wired or wireless type link comprises a telephone or radio type link.

* * * * *

UNITED STATES PATENT AND TRADEMARK OFFICE
CERTIFICATE OF CORRECTION

PATENT NO. : 5,023,929

DATED : June 11, 1991

INVENTOR(S) : James Call

It is certified that error appears in the above-identified patent and that said Letters Patent is hereby corrected as shown below:

Column 1, line 40: Change "3,587,070" to --3,587,077--.

Column 1, line 58: Change "pre designated" to pre-designated--.

Column 2, line 16: Change "system" to --systems--.

Column 9, line 39: Change the second occurrence of "transistors" to --transistor--.

Column 9, line 41: Change "tors" to --tor--.

Column 10, line 57: Change "to" to --of--.

UNITED STATES PATENT AND TRADEMARK OFFICE
CERTIFICATE OF CORRECTION

PATENT NO. : 5,023,929

DATED : June 11, 1991

INVENTOR(S) : James Call

It is certified that error appears in the above-identified patent and that said Letters Patent is hereby corrected as shown below:

Column 11, line 20: change "claim 8" to --claim 7--.

Column 14, line 58, change "Corresponding" to --corresponding--.

Signed and Sealed this

Sixteenth Day of February, 1993

*Attest:*

STEPHEN G. KUNIN

*Attesting Officer* *Acting Commissioner of Patents and Trademarks*